United States Patent [19]
Kuster

[11] 3,816,809
[45] June 11, 1974

[54] POWER SUPPLY HAVING IMPROVED OVER-VOLTAGE PROTECTION

[75] Inventor: Karl H. Kuster, Glendale Heights, Ill.

[73] Assignee: GTE Automatic Electric Laboratories, Incorporated, Northlake, Ill.

[22] Filed: Apr. 30, 1973

[21] Appl. No.: 355,632

[52] U.S. Cl. ............... 321/14, 317/31, 317/33 UR, 321/2, 323/21, 323/DIG. 1
[51] Int. Cl. .......................... H02m 3/32
[58] Field of Search ........ 317/16, 31, 33 UR; 321/2, 321/11, 14, 18; 323/9, 17, 21, 22 T, DIG. 1

[56] References Cited
UNITED STATES PATENTS

| | | | |
|---|---|---|---|
| 3,354,378 | 11/1967 | Jewett | 321/14 |
| 3,515,974 | 6/1970 | Stich | 321/2 |
| 3,564,384 | 2/1971 | Adler | 321/2 |
| 3,701,937 | 10/1972 | Combs | 321/2 |
| 3,729,671 | 4/1973 | Jeffery et al. | 321/11 |

Primary Examiner—A. D. Pellinen
Attorney, Agent, or Firm—L. N. Arnold

[57] ABSTRACT

An efficient d-c to d-c converter power supply has over-voltage protection, the over-voltage protection circuitry being particularly applicable for use with power supplies having high current output characteristics. A reference voltage detecting device is connected to the high voltage load line as well as the control terminal of a thyristor device which is connected in series with a resistor across the load terminals so that when an over-voltage condition exists, the thyristor device is triggered into conduction, developing a voltage across the resistor which is applied to a circuit isolating device which has its output operably connected to the oscillator and shuts off the oscillator and power supply. Supplementary over-voltage protection circuits are included to provide protection against multiple failure of various components or portions of the circuitry.

8 Claims, 1 Drawing Figure

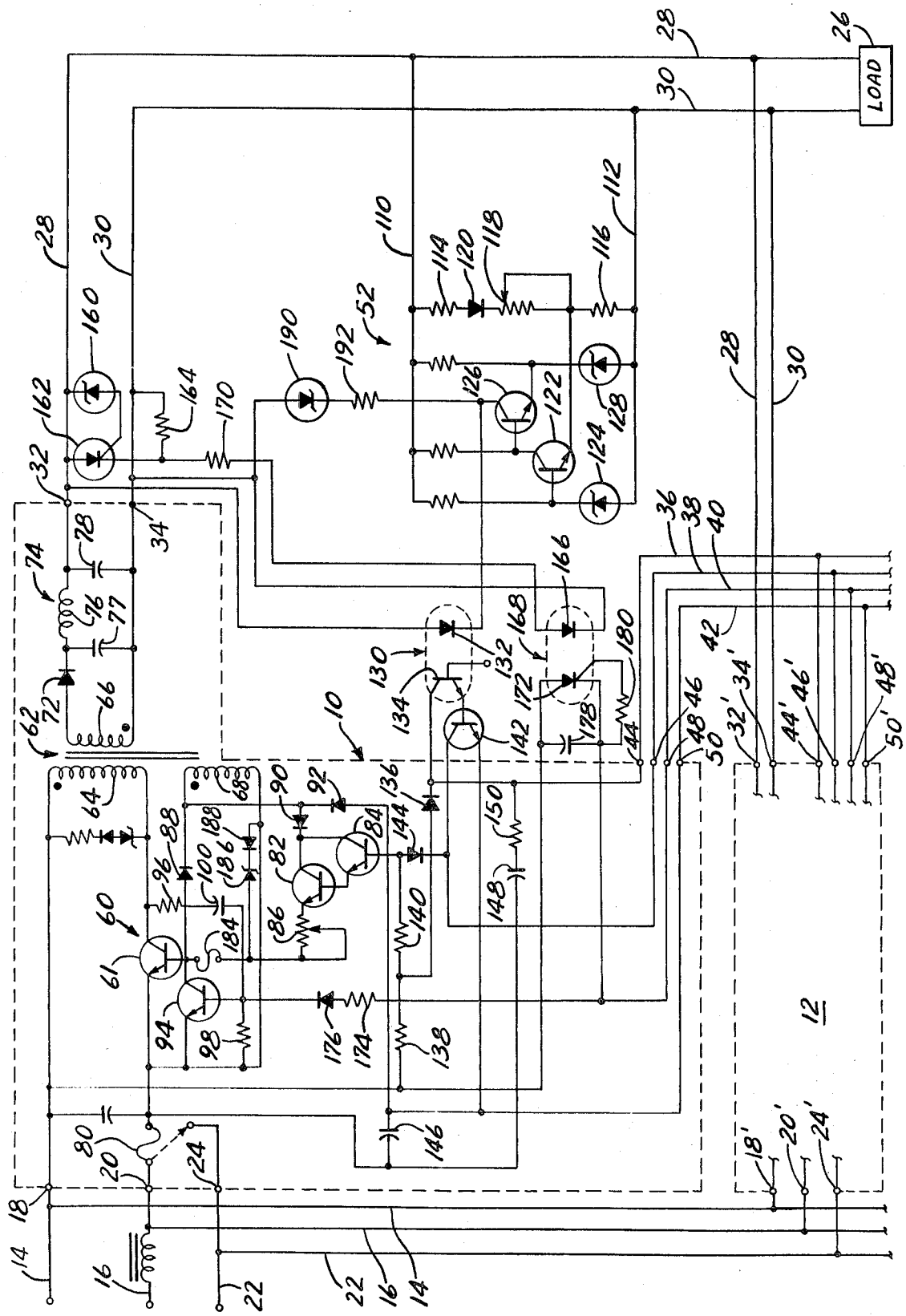

POWER SUPPLY HAVING IMPROVED OVER-VOLTAGE PROTECTION

The present invention generally relates to power supplies for the conversion of d-c energy of a first voltage to d-c energy of a second voltage. More specifically, the present invention is directed to an improved power supply including over-voltage protection circuitry.

Many d-c to d-c converters are known to employ silicon controlled rectifiers, transistors and other devices as switching elements in the initial conversion of direct current at a first potential to alternating current, as well as a rectifier for converting the alternating current back to a second direct current potential. For example, a power supply which utilizes a transistor as the switching element is disclosed in U.S. Pat. No. 3,515,974 by Frederick A. Stitch, and assigned to the same assignee as the present invention. While the power converter of the present invention employs switching techniques that are similar to the techniques disclosed in the aforementioned patent and therefore has many of the desirable operational characteristics that are described in the patent, the power supply of the present invention includes many additional desirable attributes and differences that are not found in the aforementioned patent which become quite significant when the power supply is constructed to supply large output current.

In the event such d-c power supplies are used in applications as telephone systems, for example, it should be realized that component failures or other operational breakdowns may result in the output voltage becoming uncontrolled, causing considerable circuit or system destruction. Thus, over-voltage protection circuits for such d-c power supplies have more than proved their usefulness in protecting circuits against voltage transients generated outside of the power supply as well as uncontrolled output voltage caused by component failure. For example, one commonly used over-voltage protection circuit for such power supplies is often referred to as "the electronic crowbar" which comprises a thyristor means, such as a silicon controlled rectifier, connected across the output of the power supply which is triggered by a reference voltage detecting means when the output voltage exceeds the desired maximum value. Triggering the SCR simply clamps the output voltage of the power supply to the anode-to-cathode voltage of the triggered thyristor means. If the power supply is not current limited, this overload will typically cause an input fuse to blow and stop the output voltage from rising to a destructive value.

While such a crowbar circuit is an effective and relatively inexpensive means for providing over-voltage protection in power supplies that have relatively small output current characteristics, the use of such overvoltage protection circuits in power supplies having large output current characteristics results in a considerable number of problems in terms of substantially increased cost, size and necessary thermal protection or heat sinking. This is due to the reason that the thyristor means (most commonly an SCR) must have electrical characteristics that are compatible with the output levels of the power supply. If, for example, a 5 v dc, 60 ampere power supply is provided with the aforementioned crowbar circuit for over-load protection, it may be necessary that an SCR be provided that would conduct about 96 amperes, with an $I^2r$ rating to discharge a 150,000 farad bank of capacitors and a heat sink that is capable of dissipating about 150 watts of power. In addition to the large physical size required to accommodate such requirements, the cost of the individual components would be substantial. Moreover, such an overvoltage protection circuit would dissipate considerable energy during operation, which is also undesirable.

Accordingly, it is a primary object of the present invention to provide a d-c to d-c converter power supply having improved operating efficiency at full load as well as at reduced load as well as improved overvoltage protection circuitry, the power supply being particularly adapted for supplying high d-c output current.

Another object of the present invention is to provide such an improved power supply with improved overvoltage protection circuitry, wherein the overvoltage protection circuitry may be constructed using inexpensive components, none of which are required to carry the full output load current of the power supply.

Yet another object of the present invention lies in the provision for including supplementary over-voltage protection circuitry to guard against the multiple failure of components of circuitry and thereby provide additional protection to the overall system in which the power supply may be incorporated as well as to the power supply itself.

Other objects and advantages will become apparent upon reading the following detailed description, while referring to the attached drawing which is an electrical schematic diagram of a d-c to d-c converter power supply embodying the present invention.

Broadly stated, and referring to the drawing, there is shown a power supply which includes a number of d-c to d-c converters 10 and 12, with only converter 10 being shown in detail. The portions of the converters shown within the dotted lines are intended to be substantially similar and, accordingly, the details of the converter 12 are not shown. In addition to the two illustrated converters, it is contemplated that an even greater number may be included within the power supply to increase the current capacity being generated. For example, in the event the power supply is designed to provide a 5 volt, 60 amp d-c output and each of the converters individually supplies a 5 volt, 12 amp d-c output, it is seen that a total of five of such converters would be required. In the illustrated embodiment, the power supply is connected to a d-c source such as a station battery (not shown) through input lines 14 and 16 which extend to input terminals 18 and 20 of the converter 10 as well as corresponding input terminals 18' and 20' of the converter 12. A third line 22 is also provided to terminals 24 and 24' and provides an indicating and/or alarm signal in the event an input fuse is blown. The output of the power supply is connected across a load 26 through load lines 28 and 30 which extend to high and low voltage load terminals 32 and 34 of the converter 10 as well as corresponding terminals 32' and 34' of the converter 12. Thus, in the event five converters are utilized in the power supply and each provides 5 v d-c output of 12 amps, a total of 60 amps would be available at the load with the interconnection as shown. To keep the individual converters from supplying more than their equal share of power so that any one of them will not be damaged due to overheating or the like, interconnections between the various converters are provided to regulate the output voltage and to provide over-voltage protection for the power supply as a whole. Thus, leads 36, 38, 40 and 42 extend from terminals 44, 46, 48 and 50 of the converter 10 to the corresponding terminals 44'-50' at the converter 12. As will be more fully described hereinafter, these interconnections enable a voltage regulator circuit, indicated generally at 52, to sense minor fluctuations in the output voltage across the load lines 28 and 30 and adjust the operation of each of the individual converters to regulate the output voltage. Additionally, an over-voltage protection circuit is operable to shut down all of the converters once an over-voltage condition is detected across the load lines 28 and 30.

In keeping with the present invention, and referring to the converter 10 shown in detail in the drawing, it generally consists of an oscillator switch, indicated generally at 60 and including a power switching transistor 61, a transformer 62 having a primary winding 64, a secondary winding 66 and a drive winding 68. A rectifier 72 is provided to convert the a-c signal appearing in the secondary winding 66 to direct current potential across the output terminals 32 and 34. The oscillator switch 60 is essentially a transistorized blocking oscillator that is connected to a source of d-c potential, such as a battery which, during its conductive state conducts current for a predetermined period of time from the d-c source to the primary winding 64 of the transformer. The field of the transformer 62 collapses after the predetermined period conducting potential from its secondary winding through the rectifier 72, a filter, indicated generally at 74 and comprising an inductor 76 and capacitors 77 and 78, to the load 26.

Turning more specifically to the oscillator switch 60, the transistor 61 has its collector-emitter path in the negative lead extending from terminal 20 through an input fuse 80, with the transistor 61 acting as an oscillator power switch. A pair of transistors 82 and 84, which are connected in a Darlington configuration, together with a variable resistor 86 and diodes 88, 90, and 92 are connected to the base of transistor 61 and function as a regulator for controlling the power switching transistor 61.

A transistor 94, together with resistors 96, 98 and a capacitor 100 provide a conduction limiting circuit for the switching transistor 61. As will be more fully explained hereinafter, transistor 94 is also part of the over-voltage protection circuit and is operable to render the switching transistor 61 non-conductive in the event an over-voltage condition is detected in the output load lines 28 and 30.

The converter 10 is basically a high power blocking oscillator, with the combination of the power transistor 61 and the converter transformer 62 forming a regenerative circuit. The polarities of the primary winding 64 and drive winding 68 are such that a positive feedback occurs and the secondary winding 66, in conjunction with the rectifier 72, blocks secondary current while the transistor 61 is conducting. The switching transistor 61 has essentially an inductive load and a generally constant voltage is switched across the primary winding of the transformer 62. Additionally, the current flowing through the primary winding 64 is also the collector current of the switching transistor 61.

At the start of conduction, the initial collector current is about zero and increases linearly with time, until the relatively constant base current supplied to the switching transistor 61 becomes inadequate to maintain the transistor in saturation. As the transistor comes out of saturation, the voltage across the primary winding 64 begins to decrease and initiates collapse of the transformer field which effectively turns off the transistor 61 because of the reversing voltage on the drive winding 68. The secondary voltage in winding 66 also reverses directions so that the stored inductive energy is released to a capacitor 77 through a diode 72. Since the power switching transistor 61 is not directly connected to the load 26 connected to the terminals 32 and 34, an overload condition has no effect on the switching transistor 61.

When the current in the secondary winding 66 approaches zero, the drive winding 68 no longer provides the reverse drive current to the base of transistor 61 and allows the transistor to again conduct in response to forward bias potential which is supplied by transistors 82 and 84. Transistors 82 and 84 regulate the drive current applied to the base of transistor 61 and, so doing, control the peak collector current of the switching transistor 61 to the proper magnitude. The square of the peak collector current is directly proportional to the energy stored per cycle and, since the conversion frequency is inversely proportional to the peak collector current, the net result is that the power controlled by the converter is directly proportional to the peak collector current. The peak collector current may be effectively controlled by regulating the base current supplied to the transistor 61.

Thus, efficient switching of the converter will result from the proper shaping of the base current being applied to the transistor 61 and this is largely a function of the base drive regulator circuit of which the transistors 82 and 84 are the principal functioning elements. Transistors 82 and 84 act as a dependent current generator isolating the transistor 61 from the drive winding 68 so that transistor 61 is not responsive to voltage fluctuations in the drive winding. Because of this, the end of the conduction period is not precisely determined by the drive winding 68. As transistor 61 comes out of saturation toward the end of the conduction period, due to the fact that the base current supplied has a maximum limit determined by the transistors 82 and 94 (in combination with the variable resistor 86) and the base current is not sufficient to maintain the transistor 61 in saturation.

In accordance with an important aspect of the present invention, it is desirable that the switching transistor 61 be rapidly shut off for power efficiency considerations and, in this connection, a conduction limiting circuit defined by resistors 96, 98 and capacitor 100 acting in combination with the transistor 94 accelerates the degenerative turn-off. By selecting the proper values of resistor 96 and capacitor 100, the RC network will sense the slope of the voltage drop across transistor 61 and, responsive to a predetermined steepness of the slope of the voltage drop, will cause transistor 94 to start conducting which shunts the base current away from transistor 61 and increases the steepness of the slope causing transistor 94 to additionally increase its conduction and shunt more base current from transistor 61 producing an avalanche condition which greatly accelerates the shut-off of the power switching transistor. With high power converters, the efficiency of the switching action of transistor 61 is significant and with the described conduction limiting circuit incorporated in a 5 volt 12 amp converter, considerably less power loss was experienced in the switching transistor 61. Additionally, since the described conduction limiting circuit is essentially floating with respect to the drive winding 68, it has been found to operate more effectively at loads less than 100 percent and is not designed to become operative upon reaching any certain predetermined voltage level. Resistor 98 is preferably of a relatively large value and is intended to discharge capacitor 100 after its function is performed. Moreover, the high value of resistor 98 also maintains transistor 94 in a high gain operation which is desirable for accelerating the degenerative shut-off of transistor 61.

Turning now to the voltage regulation circuitry 52, it effectively samples the voltage that appears in load lines 28 and 30 through sense leads 110 and 112 which are connected to a voltage divider defined by resistors 114, 116, variable resistor 118 and a diode 120 connected in series. The output of the divider taken between resistors 116 and 118 is connected to an emitter of a transistor 122, which acts as a comparator, comparing a reference voltage obtained through a reference diode 124 connected to its base to a voltage obtained from the voltage divider circuit.

The output of transistor 122 is applied to the base of the transistor 126 which acts as a d-c error amplifier the bias for which is supplied through a diode 128. The output signal from the collector of d-c amplifier transistor 126 is applied to a circuit isolating means, shown to be an optical coupler 130. In the illustrated embodiment, the collector is connected to the cathode of a light emitting diode 132 within the optical coupler which also includes a light sensitive or photo-transistor 134 which is adapted to conduct a current through the collector-emitter path that is directly proportional to the current being conducted through the light emitting diode 132. In this manner, it is seen that if the voltage divider circuit is above a predetermined value, for example, 5 volts for the embodiment described, and is detected by transistor 122, it will cause transistor 122 to conduct less current and will thereby cause transistor 126 to increase its conduction and thereby increase the current through light emitting diode 132 thereby providing an increased collector current in the photo-transistor 134. As is evident from the above, it is seen that the photo coupler 130 effectively isolates the voltage regulator circuit 52, which is designed to operate with voltages of approximately 5 volts from the substantially higher voltage levels that are present in the oscillator and its associated circuitry located on the input side of the converter.

The photo-transistor 134 has its collector connected to a diode 136 which in turn is connected through a resistor 138 to the positive input terminal 18 as well as through a resistor 140 to the base of transistor 84. The emitter of photo-transistor 134 is connected to the base of a transistor 142, the collector of which is connected to the base of transistor 84 through a diode 144, and the emitter of which is connected to diode 92 as well as a capacitor 146. Capacitor 146 is in turn connected to the low voltage terminal 20 through the fuse 80 as well as to another capacitor 148 connected in series with a resistor 150, these two components providing critical damping for the voltage regulating circuit 52.

The transistor 142 controls the peak collector current of switching transistor 61 by controlling the base current to the transistor 84 which thereby controls the base current to the switching transistor 61.

More specifically, the base current for transistor 61 is supplied by the drive winding 68 through diode 90, transistor 82 and adjustable resistor 86, with the collector current of transistor 82 being controlled by transistor 84. The base current into transistor 84 is provided by the input line 14 through resistors 138 and 140 which also comprise a voltage divider through diode 136 to the collector of the photo-transistor 134 within the optical coupler 130. While the current flowing through resistors 138 and 140 flows into the base of transistor 84, part of that current is also shunted away from the base through diode 144 into the collector of transistor 142 so that during regulation, the amount of current flowing to the transistor 84 is controlled. In terms of the overall operation of the voltage regulator circuit 52, if the output voltage across the load lines 28 and 30 goes above 5 volts from the foregoing description it is seen that transistor 126 will increase its rate of conduction which will correspondingly increase the rate of conduction in the photo-transistor 134, increasing the conduction rate of transistor 142 and thereby effectively shunting away more base current from transistor 84 to thereby limit the base current being supplied to the main power switching transistor 61. This limiting action causes the transistor 61 to go into degenerative cut-off at an earlier time which will reduce the voltage level across the load. It should be understood that while the two transistors 82 and 84 are included in the Darlington amplifier configuration, a single transistor could be substituted for the two shown; however, the single transistor that would be used to replace them is presently more expensive than the Darlington pair shown.

In keeping with the present invention, the voltage regulator circuit 52 is shown in conjunction with the converter 10, but is operable to effectively regulate all of the converters that may be included within the power supply by virtue of the interconnection with the other converters. To this end, the tracking voltage that appears at the collector of the phototransistor 134 is applied through terminals 44 and leads 36 to terminals 44' of the converter 12 which is connected to the cathode of a diode substantially similar to diode 136 within the converter 10. Similarly, the cathode of diode 144 and the collector of transistor 142 are connected to terminal 46 which is applied through lead 38 to terminals 46' and to substantially similar components within the other converters. The emitter of transistor 142, which is connected to the capacitor 146, is also connected to terminal 50 to comparable terminals 50' of the other converters through lead 42. The charge that is present in capacitor 146 effectively floats the emitter of transistor 142 and, because of the interconnections with the other similar capacitors in the other converters through lead 42, the charge level is substantially equal for all of the converters and thereby causes all of the converters to operate substantially simultaneously. The diodes 136 and 144 provide the necessary isolation for one converter relative to another so that there can be no reverse current flowing to the base of transistor 84 that is supplied by another converter within the power supply.

In accordance with an important aspect of the present of the present invention and turning to the overvoltage protection circuitry for the power supply, a reference diode 160 is connected between the high voltage load line 28 and the control terminal of a thyristor, such as a silicon controlled rectifier (SCR) 162 which has its anode also connected to the load line 28. The cathode of the SCR 162 is connected to the low voltage load line 30 through a resistor 164 and to a photoemitting diode 166 within an optical coupler 168 through a second resistor 170. The cathode of the light-emitting diode 166 is also connected to the low voltage load line 30. In operation, if the voltage across the load lines 28 and 30 exceeds a predetermined threshold voltage which causes the reference diode 160 to conduct, it will trigger SCR 162 and generate a voltage across resistor 164 which will cause the light-emitting diode 166 to conduct. A light sensitive SCR 172 within the photo coupler 168 will be triggered into conduction, since it has its positive anode voltage being supplied by the input line 14 and when in conduction will provide current through a resistor 174 and diode 176 to the base of transistor 94. The base current supplied is effective to cause transistor 94 to go into saturation thereby shunting the base current away from transistor 61 and will effectively shut down the oscillator 60 and converter 10. By virtue of the connection between the cathode of SCR 172 through terminal 48 and lead 40 to terminals 48' of the associated converters, current will be applied to similar transistors corresponding to transistor 94 within the other converters and effectively shut off all converters responsive to the detection of an over-voltage condition. Thus, the single overvoltage detection circuit is effective to shut down the complete power supply. While the photo coupler 168 may include a photo-transistor rather than the illustrated photosensitive SCR 172 the use of a photo-transistor would require a suitable latching circuit.

The use of the SCR 172 is preferred inasmuch as it will latch up the oscillator 60 once it is triggered. A capacitor 178 and a resistor 180 are provided to guard against noise triggering the SCR 172. When it is desired to re-start the power supply, it is necessary to remove the positive bias of the anode to cathode of SCR 172 and this may be achieved by either disconnecting the input terminal 18 or momentarily tying terminal 48 to terminal 18 which would put the anode and cathode of SCR 172 at the same potential and thus reset the SCR 172.

In keeping with the present invention, it is conceivable that the above described over-voltage protection circuitry may become inoperative due to a component failure or the like and, accordingly, a supplemental over-voltage protection circuit comprising a fuse 184, a reference diode 186 and blocking diode 188 is provided.

As shown in the drawing, fuse 184 has one end connected to the base of transistor 61 and the other end connected to the cathode of reference diode 186 which in turn has its anode connected to the cathode of a blocking diode 188 and the blocking diode is connected to the drive winding 68. In operation and assuming that the output voltage is climbing because of an over-voltage condition, the voltage appearing across capacitor 77 will be reflected across the drive winding 68 of which will also begin to rise. As this reflected voltage becomes sufficiently large to cause reference diode 186 to conduct, it will conduct a relatively large current because of the low series impedance and blow the fuse 184 which then prohibits drive current being applied to the base of transistor 61 and will thereby shut off the converter.

In addition to the over-voltage protection that is provided by this supplemental protection circuit, an operational advantage is also obtained by the inclusion of the fuse in the base circuit of the transistor 61 for the reason that the resistance of many fuses increases with an increase in the temperature. If the transistors 61, 82 and 84 are of the type wherein the base-to-emitter voltage decreases with a rise in temperature for a constant current, a fuse having an increased resistance with an increased temperature will compensate for the decreased base-to-emitter voltage decrease in the above mentioned transistors caused by increased temperature.

In keeping with the present invention, yet another supplementary over-voltage protection circuit may be provided and comprises a reference diode 190 having its anode connected through a resistor 192 to the collector of transistor 126. The cathode of the reference diode 190 is connected to the cathode of the light emitting diode as well as to the low voltage load line 30. The purpose of this additional supplemental overvoltage protection circuit is to provide additional protection against other failure modes and multiple component failures. For example, in the event the voltage regulator sense leads 110, 112 are open circuited, the power supply output voltage cannot climb very high because the reference diode 190 will begin to conduct and thereby take over regulation, or SCR 162 will be triggered to shut off the converter 60 in the manner previously described. Additionally, if either of the load lines 28, 30 are disconnected from the terminals 32, 34 and the voltage regulator sense leads 110, 112 are not disconnected, the leads 110 and 112 cannot conduct the full load current because these leads preferably are of a relatively small wire size. If either of reference diodes 124 or 128, or transistor 126 becomes open circuited, or if transistor 122 becomes short circuited between its collector and its emitter, the output voltage cannot climb very high because reference diode 190 will again take over regulation or the SCR 162 will be triggered to turn off the power supply. However, if SCR 162 cannot be triggered because reference diode 160, diode 176, transistor 94 or lead 40 become open circuited, reference diode 190 will begin to conduct responsive to the voltage exceeding its breakdown voltage and it will again take over regulation.

From the foregoing description, it should be understood that the triple over-voltage protection circuitry that has been described herein is effective to greatly minimize the possibility of damaging a system in which the power supply is incorporated due to an overvoltage condition. If both of the optical couplers 130 and 168 are inoperative, the fuse 184 will effectively shut down the converters. If all of the fuses are mislabeled or defective and the optical coupler 130, transistor 142 or diodes 136 and 144 are open circuited, the optical coupler 168 signal path will effectively turn off the power supply. Additionally, if one of the voltage regulator remote sense leads 110, 112 is missing and the optical coupler 168 is inoperative, the overvoltage circuitry which includes the reference diode 190 will effectively maintain the output voltage from reaching destructive levels.

Moreover, the conduction limiting circuitry embodying the present invention that accelerates the turn-off of the switching transistor 61 provides operating advantages in terms of reduced power loss resulting from the operation of the oscillator 60 and is particularly advantageous because of its effective operation even when the power supply is operating at less than full load capacity.

The primary overvoltage protection circuitry has many desirable attributes in that it may be constructed using conventional components which are not required to carry the full load current of the power supply when it is in operation. This is a desirable feature, particularly when the power supply is designed to provide high output current. Additionally, the operation of the circuitry to shut down the power supply responsive to an overvoltage condition eliminates unnecessary power drain from a source as well as the attendant equipment that may be necessary to effectively dissipate the heat generated. The effective overvoltage protection of the power supply of the present invention, which guards against multiple component or circuit failures greatly reduces the possibility of causing destruction in a system in which the power supply is incorporated.

It is of course understood that although a preferred embodiment of the present invention has been illustrated and described, there are modifications which will be apparent to those skilled in the art; and accordingly, the scope of the present invention should be defined only by the appended claims and equivalents thereof.

Various features of the invention are set forth in the following claims.

What is claimed is:

1. A power supply for connection between a source of direct current potential and a load, comprising:

a converter including an oscillator for producing an alternating current potential and a transformer having a primary winding connected to said oscillator, said oscillator including switching means comprising a switching transistor connected between the source and said primary winding, a second transistor connected to said switching transistor and operative to render said switching transistor non-conductive when said second transistor becomes conductive responsive to receiving a signal, said switching transistor being an NPN transistor having its collector connected to said primary winding and the collector emitter path of said second transistor being connected between the base and emitter of said switching transistor, rectification means connected between the secondary winding of said transformer and the load for converting said alternating current potential to direct current potential and applying it to the load, a control circuit including over-voltage detecting means for conducting a signal responsive to an over-voltage condition, said detecting means being connected to said second transistor so that when said signal is conducted by said detecting means, said second transistor is placed into conduction which effectively renders said switching transistor non-conductive and thereby shuts off the oscillator and converter, (A power supply as defined in claim 6 including) means for supplying the base current for said switching transistor including a drive winding having a reflected voltage proportional to the voltage of a secondary winding, (a) fuse means positioned in the base of said switching transistor for open circuiting said base circuit to thereby cut off said switching transistor, and a current supply circuit for said fuse means comprising a blocking diode in series with a reference diode positioned between said drive winding and said fuse, said diodes normally blocking current flow in both directions, said current supply circuit being adapted to conduct current to blow said fuse when said reflected voltage exceeds a predetermined value.

2. A power supply as defined in claim 1 wherein said reference diode is adapted to conduct when said reflected voltage exceeds said predetermined value, said blocking diode being forward biased responsive to said reference diode being in conduction, the combination of said conducting diodes providing a low impedance current path from said drive winding to said fuse for supplying current that is sufficient to blow said fuse.

3. A power supply as defined in claim 1 wherein current regulator means are provided connected to the base terminal of said switching transistor for driving said switching transistor, and said control circuit includes first over-voltage detecting means connected across said load including comparater transistor switching means, first optical coupler means including a light-emitting semiconductor having its cathode connected to the collector of said comparator switching means and its anode connected to the high voltage side of said rectification means and a light-sensitive photo-transistor having an emitter and a collector, a voltage divider network connected between said source and said current regulator means for supplying drive current thereto, first diode means having its anode connected to the midpoint of said voltage divider network and its cathode connected to the collector of said photo-transistor for shunting said drive current from said current regulator means, and peak current transistor means having its collector connected to a reference voltage through second diode means reversed biased with respect to said reference voltage and its emitter connected to said current regulator means through third diode means poled to shunt said drive current from said current regulator means for regulating said switching transistor.

4. A power supply as defined in claim 3 wherein said first over-voltage detecting means includes a second reference diode having its anode connected to the low voltage side of said rectification means and its cathode connected to the collector of said comparator switching means for further regulating the conduction state of said switching transistor.

5. A power supply as defined in claim 3 wherein said control circuit further includes second over-voltage detecting means including thyristor means having anode, cathode and control leads with said anode lead connected to the high voltage side of said rectification means, said control lead connected through a second reference diode to the high voltage side of said rectification means, second optical coupler means including a light-emitting semiconductor having its cathode connected to the low voltage side of said rectification means and its anode connected to the cathode lead of said thyristor means and a light-sensitive photo-rectifier having its anode lead connected to the high voltage side of said oscillator and its cathode lead connected to the base of said second transistor for further regulating the conduction state of said switching transistor.

6. A dc to dc power supply circuit connectible between a dc source and a dc load and including in combination: oscillator means connectible to said source for producing an ac potential, rectification means connected between said oscillator means and said dc load for converting ac potential to dc potential for application to said load, semiconductor switching means connected to said oscillator means and having a primary switching transistor connected between said oscillator means and said source and a secondary control transistor operative to render said switching transistor nonconductive when said control transistor is conductive, current regulator means connected to the base terminal of said switching transistor for driving said switching transistor, first over-voltage detecting means connected across said load including comparator transistor switching means having its collector connected to the low voltage side of said rectification means through a first reference diode having its cathode connected to said collector, first optical coupler means including a light-emitting semiconductor having its cathode connected to the collector of said comparator switching means and its anode connected to the high voltage side of said rectification means and a light-sensitive phototransistor having an emitter and a collector, a voltage divider network connected between said source and said current regulator means for supplying drive current thereto, first diode means having its anode connected to the midpoint of said voltage divider network and its cathode connected to the collector of said photo-transistor for shunting said drive current from said current regulator means, peak current transistor means having its collector connected to a reference voltage through second diode means reversed biased with respect to said reference voltage and its emitter connected to said current regulator means through third diode means poled to shunt said drive current from said current regulator means, and second over-voltage detecting means including thyristor means having anode, cathode and control leads with the anode lead thereof connected to the high voltage side of said rectification means, the control lead thereof connected to a second reference diode in turn connected to the high voltage side of said rectification means, second optical coupler means including a light-emitting semiconductor having its cathode connected to the low voltage side of said rectification means and its anode connected to the cathode lead of said thyristor means and a light-sensitive photo-rectifier having its anode lead connected to the high voltage side of said oscillator means and its cathode lead connected to the cathode lead of said thyristor means and a light-sensitive photo-rectifier having its anode lead connect to the high voltage side of said oscillator means and its cathode lead connected to the base of said secondary control transistor whereby said first over-voltage detecting means through said first reference diode or said first optical coupler means and said second over-voltage detecting means through said second optical coupler means are effective to regulate the conduction state of said switching transistor.

7. A power supply as defined in claim 6 including means for supplying the base current for said switching transistor including a drive winding having a reflected voltage proportional to the voltage of a secondary winding, fuse means positioned in the base of said switching transistor for open circuiting said base circuit to thereby cut off said switching transistor, and a current supply circuit for said fuse means comprising a blocking diode in series with a third reference diode positioned between said drive winding and said fuse, said diodes normally blocking current flow in both directions, said current supply circuit being adapted to conduct current to blow said fuse when said reflected voltage exceeds a predetermined value.

8. A power supply as defined in claim 7 wherein said third reference diode is adapted to conduct when said reflected voltage exceeds said predetermined value, said blocking diode being forward biased responsive to said third reference diode being in conduction, the combination of said conducting diodes providing a low impedance current path from said drive winding to said fuse for supplying current that is sufficient to blow said fuse.

* * * * *

UNITED STATES PATENT OFFICE
CERTIFICATE OF CORRECTION

Patent No. 3,816,809           Dated   June 11, 1974

Inventor(s)   KARL H. KUSTER

It is certified that error appears in the above-identified patent and that said Letters Patent are hereby corrected as shown below:

Column 12, lines 9-12, after "means" delete -- and its cathode lead connected to the cathode lead of said thyristor means and a light-sensitive photo-rectifier having its anode lead connect to the high voltage side of said oscillator means --

Signed and sealed this 1st day of October 1974.

(SEAL)
Attest:

McCOY M. GIBSON JR.
Attesting Officer

C. MARSHALL DANN
Commissioner of Patents